Figure 1:
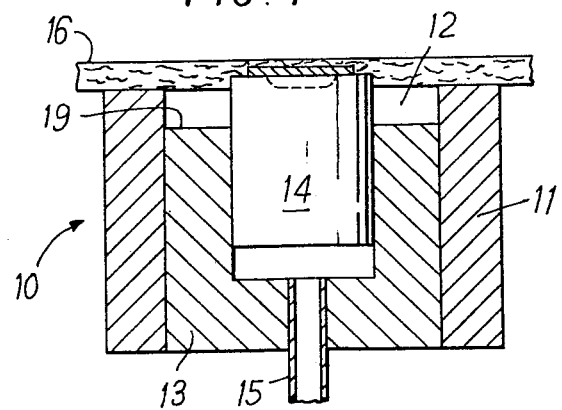

United States Patent [19]
Bramley

[11] 3,961,011
[45] June 1, 1976

[54] METHOD OF MAKING NETTING BY MOLDING PLASTIC ABOUT STRAND CROSSINGS

[76] Inventor: Anthony Bramley, Gosford House, Gosford, Kidlington Oxfordshire, England

[22] Filed: Apr. 9, 1974

[21] Appl. No.: 459,339

[30] Foreign Application Priority Data
Apr. 13, 1973 United Kingdom............... 18006/73

[52] U.S. Cl.................................. 264/251; 264/254; 264/263; 264/265; 264/271; 264/274; 264/279; 264/280; 264/328; 264/331; 264/DIG. 81

[51] Int. Cl.²....................... B29C 5/00; B29D 3/00; B29F 1/00

[58] Field of Search ........... 264/249, 258, 263, 328, 264/DIG. 81, 251, DIG. 70, 149, 167, 254, 174, 279, 280, 266, 250, 271, 274, 319, 331, 265; 161/DIG. 6, 57–59; 425/121, 126, 416, 449, 465, 500, 123, 125, 129, 111, 112, 415; 87/8

[56] References Cited
UNITED STATES PATENTS

| | | |
|---|---|---|
| 1,895,456 | 1/1933 | Farmer .................................. 60/397 |
| 2,361,348 | 10/1944 | Dickson et al...................... 264/278 |
| 2,920,354 | 1/1960 | Zumbrunnen ...................... 264/251 |
| 2,949,807 | 8/1960 | Herzog et al. ............................. 87/8 |
| 3,068,522 | 12/1962 | Nickerson et al................... 264/278 |
| 3,335,634 | 8/1967 | Betta.......................................... 87/8 |
| 3,591,215 | 7/1971 | Frost................................... 264/251 |
| 3,608,034 | 9/1971 | Bramley.............................. 264/167 |

*Primary Examiner*—Willard E. Hoag
*Attorney, Agent, or Firm*—Woodhams, Blanchard and Flynn

[57] ABSTRACT

Netting, made by bonding together crossing strands consisting of or containing thermoplastic material by means of individually moulded masses of thermoplastic material, is given enhanced bond strength by compressing the crossing strands together within the die cavities employed for moulding the thermoplastic masses. The improvement is particularly marked in the case of netting made from braided strands, for example of nylon, and intended for use as cargo nets. The compression may be applied by a pressure member, for example a fluid-actuated piston, mounted within the die. If desired, a pair of counteracting pistons can be used. After compressing the strands, the pistons may be withdrawn before the thermoplastic material is introduced or may be forced back by the entering thermoplastic material.

9 Claims, 3 Drawing Figures

METHOD OF MAKING NETTING BY MOLDING PLASTIC ABOUT STRAND CROSSINGS

The present invention relates to the manufacture of nets and netting.

In the specification of my U.S. Pat. No. 3,608,034 there is described and claimed netting suitable for making up into nets for conventional purposes, composed of regularly arranged flexible threads which consist of or contain thermoplastic filaments, the threads being joined to one another to form netting by masses of plastics material individually moulded and bonded to each thread at each thread junction.

The present invention has for its object the production of netting having an enhanced bond strength at the moulded bonds and is of especial interest in connection with heavy duty nets made from braided strands, which may be used, for example, as cargo nets.

In the method according to this invention the crossing threads are compressed together within their respective moulding dies and the compression released to make way for the thermoplastic material injected to form the moulded bonding masses.

The invention also provides apparatus comprising the necessary strand advancing means and moulding equipment in which each die cavity is provided with at least one pressure member or piston, the end face of which in a retracted position forms a portion of the wall of the cavity, the pessure member or piston being movable from its retracted position towards the centre of the cavity, whereby in use it will compress together the threads crossing within the cavity, and being retractable to make way for incoming thermoplastic material during a moulding cycle.

Compression of the strands causes them to expand laterally and they are thus more firmly trapped in the moulded mass of thermoplastic material. The compressibility and lateral expansion are particularly marked in the case of braided strands. The face of the pressure member may have any desired shape appropriate to its dual function of compressing the strands and forming part of the boundary surface of the moulding cavity. The face may, for example, be flat or domed. It has, however, been found that additional bond strength advantage is obtained by employing a corrugated face, which increases the degree of engagement between the strand surface and the thermoplastic material.

The pressure member may be biased away from its retracted position by a powerful spring and thus compress the strands as the die is closed on the strand crossing, the member being forced back to its retracted position by the pressures of the subsequently introduced hot thermoplastic material. Preferably, however, the pressure member is actuated mechanically, more especially by a fluid pressure ram, or is itself constituted by a fluid-actuated piston and may be advanced to compress the crossing strands either as the die closes or subsequently. The member may then be withdrawn to leave a clear space for the thermoplastic moulding material to fill, or may be allowed to be forced back by the pressure of such material, The die will usually be constituted by two die portions, an upper and a lower, which move apart for the passage of the strands and close together for the moulding operation. A single pressure member may be included in either the upper or lower die portion, or two members may be provided, one in each die portion.

Figure 2:
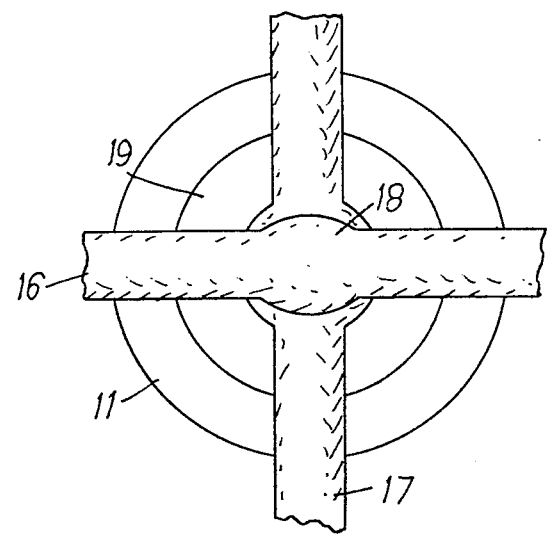

The invention will be further described, by way of example, with reference to the accompanying drawing in which:

FIG. 1 is a cross section of a lower die portion incorporating the present invention, in use; and FIG. 2 is a top plan view of the same die portion.

Figure 3:
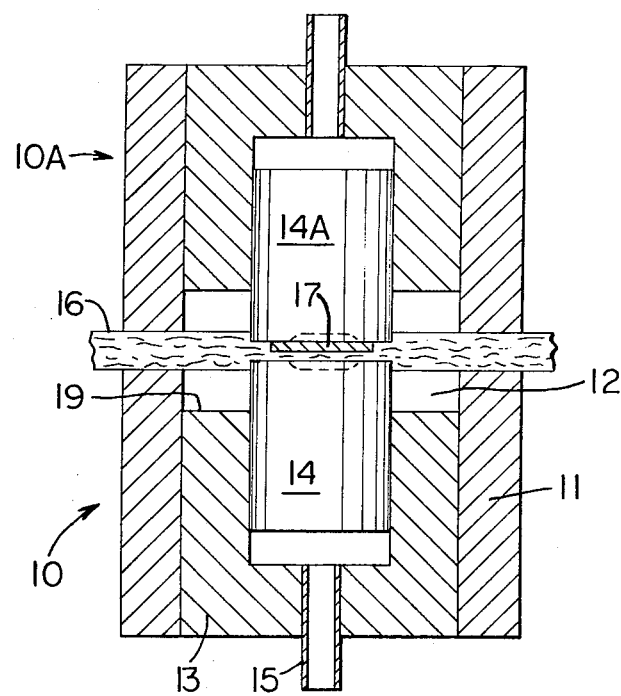

FIG. 3 discloses a modification incorporating counter-acting pistons.

The die portion 10 FIGS. (1 and 2) comprises an outer ring 11 defining the side walls of the moulding cavity 12 and a central hollow body 13 which provides a cylinder within which moves a piston-shaped pressure member 14. The piston is movable by compressed air which can be admitted through a pipe 15 passing out through the rear wall of the body 13. Alternatively, the piston can be mechanically connected to a suitable external actuator, for example a pneumatic ram.

In use, the die portion 10 is arranged beneath a complementary upper die portion, which may as in FIG. 3 incorporate a piston in similar manner to the lower portion shown, or may be plain, especially where injection takes place through the upper die portion. A longitudinal thread or strand 16 and transverse thread or strand 17 are drawn through the open die at the same time as other pairs of strands are being drawn through other dies in the formation of the net. As seen in FIG. 1, the width of the strand engaging end face of the piston exceeds the uncompressed widths of the strands 16 and 17. Suitable arrangements of dies, plastic injection equipment and thread advancing means may be found in my U.S. Pat. Nos. 3,608,034 and 3,713,761

When the die has been closed by bringing the portions together, with the respective outer die rings 11 in sealing contact with each other and with the strands, the piston 14 is advanced by admission of compressed air (or both pistons 14 and 14A where both die portions 10 and 10A are so fitted as in FIG. 3) and the two strands 16 and 17 are compressed together and laterally expanded to occupy an approximately circular cavity 18 in the die. FIGS. 1 and 2 shows the lower half of the die at this stage.

The piston 14 may then be withdrawn by applying a vacuum through the pipe 15 to return the end face of the piston to the region of the face 19 of the moulding cavity, prior to the injection of hot thermoplastic material. Alternatively, the air pressure may be released to allow the piston to be forced back by the superior pressure of the injected material. After the moulding cycle is complete the dies open and the strands are advanced for the next cycle.

This procedure gives particularly strong bonds with braided strands, for example of nylon, braided bands being particularly soft and compressible. It can, however, also show advantages in the production of netting from twines of thermoplastic filaments.

What I claim is:

1. A method of making netting comprising the steps of:
   providing braided strands composed of synthetic thermoplastic fibres or filaments;
   forming a plurality of such braided strands into an array of spaced, generally parallel longitudinal strands;
   drawing further such braided strands transversely across said array of longitudinal strands at least singly to form strand crossings where respective transverse strands cross respective lontitudinal strands;

enclosing a plurality of said strand crossings in a corresponding plurality of die cavities;

mechanically compressing said strands together within said cavities sufficiently to laterally expand the strands at the strand crossing, by advancement of a pressure member into the die cavity and into compressively deforming relation with said crossing strands releasing said mechanical compression by retracting said pressure member;

and, not earlier than said releasing, introducing thermoplastic material into said cavities to mould therein individual masses of said material bonding said strands together at said crossings.

2. The method of claim 1 including, prior to said step of compressing, the step of retracting the pressure member to a retracted position and forming a portion of the wall of the cavity with the end face of said pressure member with the latter in said retracted position.

3. The method of claim 1, in which said pressure member is a piston and said step of mechanically compressing includes compression of the crossing strands between counter-acting pistons.

4. The method of claim 1 in which said step of mechanically compressing takes place as the die closes in said enclosing step.

5. The method of claim 1 in which a said die cavity is formed at least in part by a die portion incorporating a cylinder opening to said die cavity, said pressure member being a piston movable along said cylinder from a retracted position, wherein its end face forms a portion of the wall of the die cavity, to an advanced position wherein said end face intrudes from the cavity wall central into the die cavity in opposition to the strand crossing area therein the width of said end face exceeding the uncompressed width of the crossing strands, and including prior to said step of compressing, the step of retracting said piston to its retracted position and thereby forming a portion of the wall of said cavity with said end face of said piston, the step of compressing including forceably advancing said piston and, with said end face thereof, compressing together the crossing strands in the die cavity and laterally expanding said crossing strands to occupy an approximately circular area in the die cavity, said step of releasing including at least reducing the advancing pressure on the piston to a value less than the pressure of the thermoplastic material introduced into said die cavity prior to such introduction and thereby releasing the compression of the crossed strands by the end face of the piston and thereby making way for the thermoplastic material introduced, whereby such compression of the strands and lateral expansion thereof enable same to be more firmly trapped in the molded mass of thermoplastic material, said step of introducing of said plastic material including filling of the clear space occupied by the advanced piston and left by the piston as it retracts and applying pressure to the end face of the piston in the retracting direction of such piston by means of the thermoplastic material entering the die cavity.

6. The method of claim 5 in which the step of advancing the piston includes applying a gas under pressure to the outer face of said piston to advance same into the cavity and the step of retracting includes releasing such gas pressure and permitting the piston to be forced back to its retracted position by the outward pressure of injected material on the inner end face thereof as such material is introduced into the die cavity.

7. The method of claim 5 in which the step of advancing the piston includes applying an advancing force thereto sufficient to so compress said strands and said step of introducing the thermoplastic material includes introducing such material at sufficient pressure as to apply a retracting force to the piston overriding said advancing force and thereby force such piston back to its retracted position with incoming pressurized material.

8. The method of claim 5 in which the step of retracting the piston includes externally applying a retracting force to the piston prior to the step of introducing thermplastic material to the die cavity.

9. The method of claim 8 in which the step of advancing the piston includes applying compressed gas to the outer end of the piston and the step of externally applying a retracting force to said piston includes applying a vacuum to the outer end face of the piston and thereby retracting same prior to the injection of thermoplastic material.

* * * * *